United States Patent [19]
Clausen

[11] 3,942,428
[45] Mar. 9, 1976

[54] APPARATUS FOR REMOVING ROOTS FROM BULBS OR THE LIKE CORMS

[76] Inventor: Claus Clausen, Stubberupholm, Kanalvej 53, DK-4540 Faarevejle, Denmark

[22] Filed: Nov. 29, 1973

[21] Appl. No.: 420,097

[52] U.S. Cl. .................. 99/640; 99/585; 99/637
[51] Int. Cl.² ........................................ A23N 15/08
[58] Field of Search ........................... 99/635–637, 99/639–640, 643, 585, 546, 597; 187/17

[56] References Cited
UNITED STATES PATENTS

| | | | |
|---|---|---|---|
| 861,857 | 7/1907 | Jansen | 99/640 |
| 2,638,949 | 5/1953 | Blevins | 99/643 |

Primary Examiner—Harvey C. Hornsby
Assistant Examiner—James A. Niegowski
Attorney, Agent, or Firm—Watson, Cole, Grindle & Watson

[57] ABSTRACT

In apparatus for removing roots from bulbs or the like corms, the bulbs are thrown upwards towards pairs of cooperating rollers, which catch the roots of the bulbs in the nips between the rollers and draw off the roots from the bulbs.

4 Claims, 7 Drawing Figures

APPARATUS FOR REMOVING ROOTS FROM BULBS OR THE LIKE CORMS

BACKGROUND OF THE INVENTION

The present invention relates to an apparatus for removing roots from bulbs or the like corms, comprising at least one pair of rollers wherein the two rollers of each pair are rotated in opposite directions for pulling off the roots of the bulbs.

Such apparatus is known from Dutch pat. specification No. 7010507 laid open to public inspection. The known apparatus comprises a plurality of grooves wherein one of the walls of each groove consists of the upper run of an endless conveyor belt which extends in horizontal direction as seen in the longitudinal direction of the upper run, but, as seen in a direction perpendicular thereto, is inclined in order to form a part of one of the walls of the groove concerned. The corresponding pair of rollers comprises a comparatively thick roller and a smaller roller. The smaller roller is arranged at the bottom of the groove and the larger roller is arranged side by side and a little above the smaller roller in such a way that a part of the circumference of the larger roller forms the other side of the groove concerned.

In using this apparatus, the bulbs is passed along the groove with the longitudinally extending axis of the bulb, extending almost parallel with one of the side walls of the groove (parallel with the inclined upper run of the conveyor band) and with the root end resting against the larger roller and in such a way that the bulb, when the conveyor band moves, is rotated about its longitudinal axis. During such rotation, the root ball may be gripped by the nip between the smaller and larger roller and pulled off the bulb. However, if the bulb does not move in the groove with the axis thereof orientated as explained above, the tip of the bulb may easily be damaged.

SUMMARY OF THE INVENTION

The apparatus according to the present invention is characterized in that the pair or pairs of rollers are arranged above a support for the bulbs wherein a moving mechanism abruptly moves the support upwardly towards the pair or pairs of rollers. By experiments forming the background of the present invention, it has been proved that the movement of the support will apply a throwing movement to the bulbs supported by the support. This throwing movement will move the bulbs towards the pair or pairs of rollers. At the end of this movement, the pair or pairs of rollers can catch the roots which hit the pair or pairs of rollers in the vicinity of the nips thereof, and if a pair of rollers once has caught a part of the root ball on a bulb, such pair of rollers will very gently pull off the root ball. Moreover, it has been proved that if the bulbs should be thrown towards their rollers with the tips facing the rollers, such tips will not be caught and the bulbs will fall back upon the support for being again thrown towards the rollers during the next abrupt movement. However, it may be appropriate to orientate the bulbs before the throwing movement is applied thereby enabling the size of the apparatus to be reduced because such orientation will increase the tendency for the root balls to be caught during the first throw. In accordance with the present invention, such orientation may be achieved by constructing the support in the form of a grid, the rods of which form downwardly narrowing grooves therebetween. Placed in such grooves the bulbs will have a pronounced tendency to be orientated by the support with the root ball facing upwards.

The apparatus according to the present invention involves a further advantage because such apparatus in a very simple manner may be combined with a plant for sortening the bulbs, inasmuch as the grid of the apparatus according to the present invention may be arranged as an extension of a throw-screen. Under such circumstances, it is possible to move both the throw-screen and the grid by the same moving mechanism.

Further features of the invention will be apparent from the following detailed description of an embodiment.

DESCRIPTION OF THE PREFERRED EMBODIMENT

Figure 1:
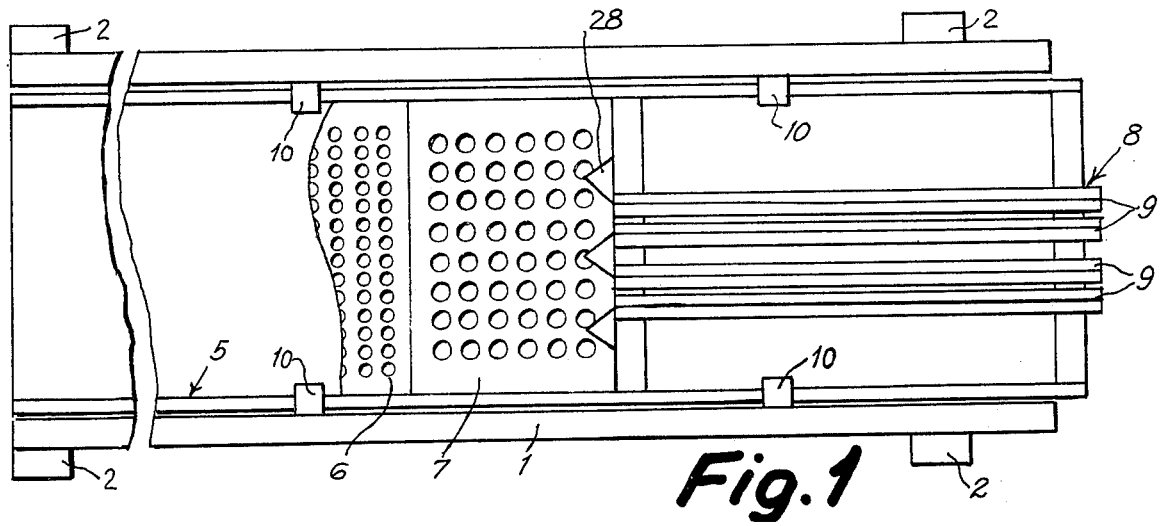
FIG. 1 shows the lower part of an embodiment of the apparatus according to the present invention combined with a sorting screen, FIG. 2 a side view of the lower part illustrated in FIG. 1, FIG. 3 an end view of the lower part illustrated in FIGS. 1 and 2, wherein an upper part of the apparatus is indicated in dotted lines.
Figure 2:
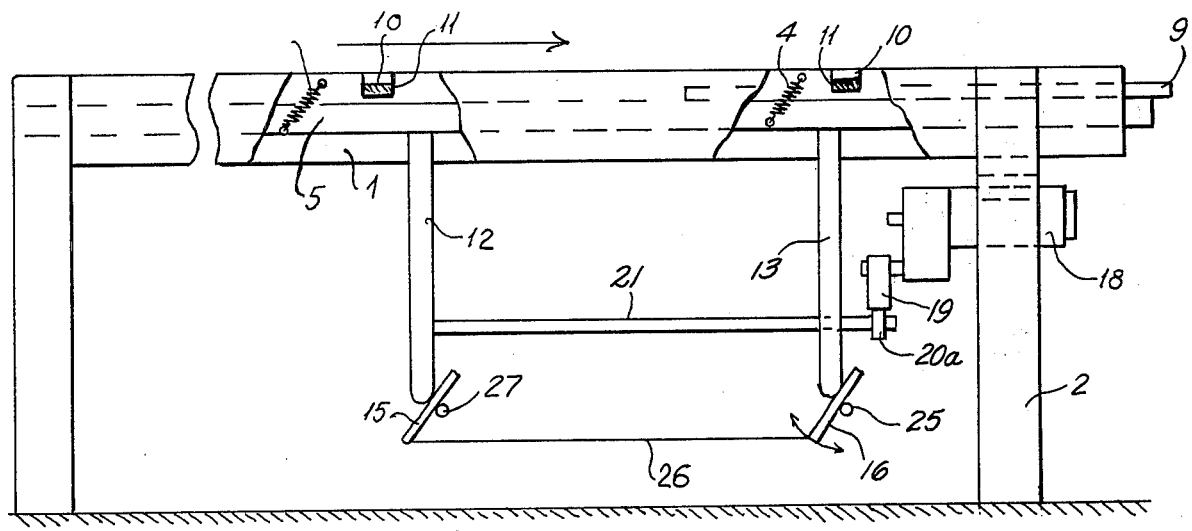
Figure 3:
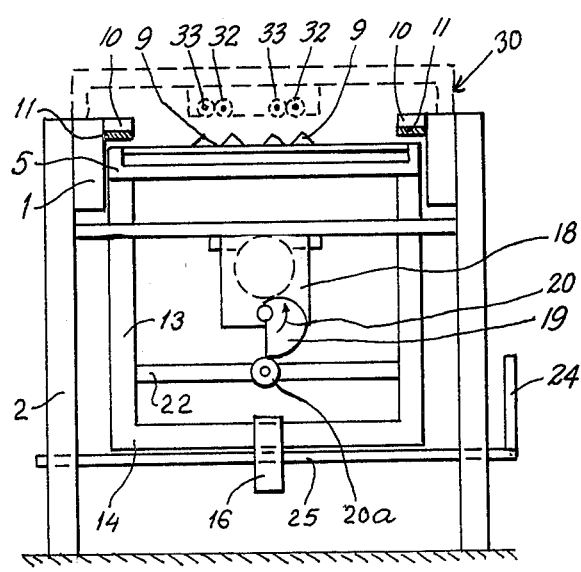

As it appears from FIGS. 1–3, the lower part of the apparatus shown therein comprises a subframe 1 having four legs 2. By means of springs 3,4 an inner frame 5 is suspended in the subframe 1. At the left hand end thereof, the inner frame 5 supports different screens 6,7 for screening bulbs in accordance with their sizes. The portion of the inner frame 5 shown at the right hand end of FIG. 1 carries a support formed as a grid which as a whole is provided with the reference numeral 8. The grid consists of grid rods 9 arranged pair by pair and having triangular cross section areas with the corners of the triangles facing upwardly. On the drawing, only two such pairs of grid rods are shown but it will be understood that further pairs of grid rods are arranged along each side of the pairs shown. However, for the sake of clarity such further pairs of grid rods have been omitted from the drawing. To the sub-frame 1 inwardly extending abutments 10 are secured, the lower surface of which are covered with felt pieces 11 for cooperation with the top surface of the inner-frame 5. The frame 5, which carries the screens 6,7 and the grid 8 is at the lower surface thereof is provided with two U-formed brackets 12,13, having lower transversally extending beams 14, FIG. 3. Beams 14 cooperate with two inclined guiding plates 15,16, FIG. 2. Between the two legs 2 at the right hand end of the apparatus in FIG. 2, a motor 18 is secured which via a gear train drives an excentric 19, the form of which appears clearly from FIG. 3. The excentric is driven by the motor 18 in the direction of rotation indicated by the arrow 20, FIG. 3, and cooperates with the outer race of a ball bearing 20a which by means of a longitudinally extending rod 21 and two transversely extending stays 22 is connected to the two downwardly extending brackets 12 and 13. By means of a handle 24, FIG. 3, it is possible to adjust the inclination of the guiding plates 15 and 16 via a shaft 25 to which the handle 24 is connected. The shaft 25 is journalled in bearings (not shown on the drawing) secured to the legs 2 and is rigidly connected to the guiding plate 16. A connecting member 26 connects the guiding plate 16 and the guiding plate 15 which by means of a shaft 27 is journalled in brackets (not shown on the drawing) secured to the legs.

The part of the apparatus illustrated in FIGS. 1-3 works in the following way:

When the motor 18 rotates the excentric 19, the excentric will move the frame 5 downwardly due to the cooperation with the ball bearing 20a and during such movement the screen plates 6,7 and the grid 8 will be subjected to a movement directed downwardly to the left in FIG. 2 due to the cooperation between the beams of the two brackets 12,13 and the inclined guiding plates 15,16. When the wide portion of the excentric 19 moves from the position shown in FIG. 3, the excentric will release the ball bearing 20a and, accordingly, the springs 3,4 will pull the screen plates 6,7 and the grid 8 upwardly. During this movement the inner frame 5 will be guided by means of the guiding plates 15,16 and the upward movement will be interrupted when the frame 5 hits the felt pieces 11 on the abutments 10. Due to the abrupt movement, bulbs positioned upon the screens 6,7 will be thrown in an inclined direction upwards and to the right in FIG. 2. In this way the bulbs will be screened by means of the screen plates 6 and 7, as it is generally known from throw-screens. Only bulbs having the correct size will pass the last screen 7 and will be thrown over upon the grid 8. In the embodiment illustrated on the drawing, the grid rods 9 are arranged pair by pair with a distance between two adjacent pairs which is a little greater than the distance between the two grid rods of each pair. In order to avoid the bulbs from falling down through the spacings between adjacent pairs of grid rods, guiding means 28 as indicated in FIG. 1 are provided, but it will be understood that also a grid may be used having equidistant grid rods.

Figure 4:
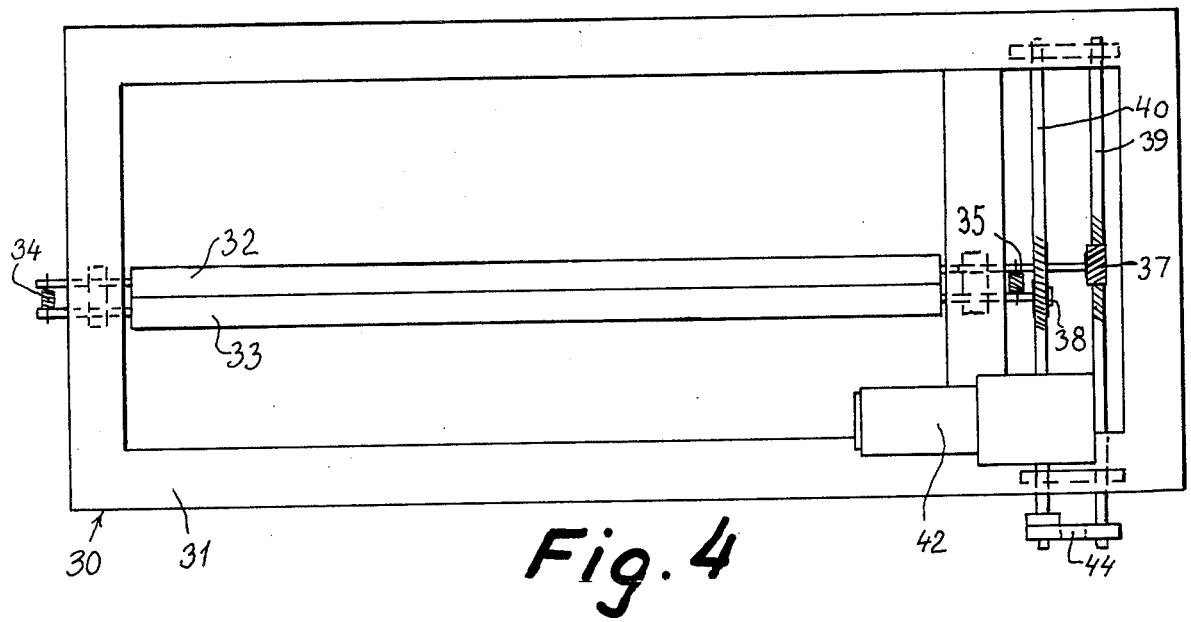
FIG. 4 shows a top view of the upper part of the apparatus in increased scale.
Figure 5:
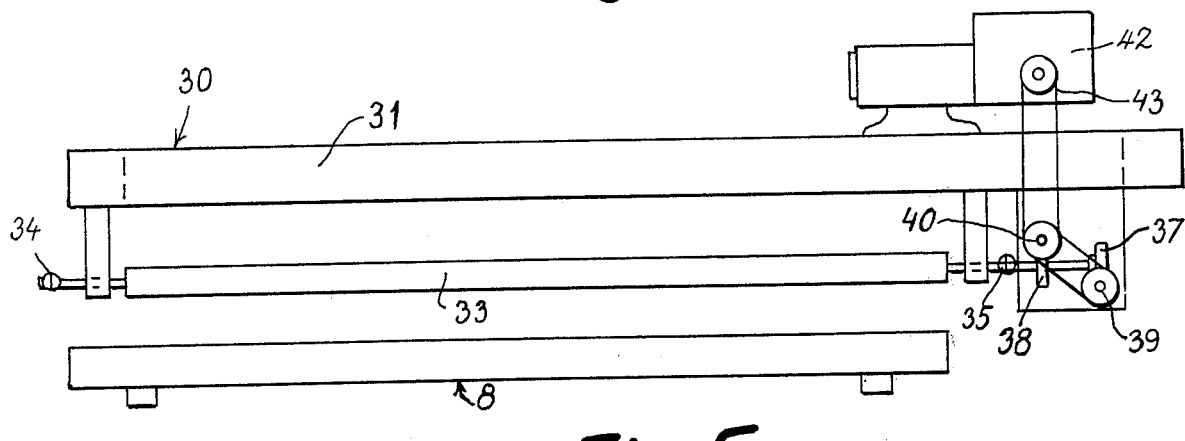
FIG. 5 shows a side view of the upper part illustrated in FIG. 4.

The apparatus also comprises an upper part 30 indicated in dotted lines in FIG. 3. The upper part is shown on an increased scale in FIGS. 4,5 and 6 and consists of a rectangular upper frame 31 which, as indicated in FIG. 3, is arranged over the portion of the lower part of the apparatus comprising the grid 8. In the upper frame and in the longitudinal direction thereof pairs of rollers 32,33 are journalled, of which, however, only one pair is shown in FIG. 4, whereas two pairs are shown in FIG. 3. From FIG. 3 it will be seen that each pair of rollers is arranged directly above the groove formed between each pair of grid rods 9. The two rollers of each pair are pressed towards each other by means of springs 34,35, FIG. 4, and the shaft of each roller is at the right hand end, as seen in FIG. 4, provided with a worm gear 37 and 38, respectively. Each of the worm gears engages a screw spindle 39 and 40, respectively, journalled in the upper frame 31. The screw spindles 39 and 40 are driven at one end thereof by means of a motor 42 arranged on the upper frame 31. The two screw spindles 39 and 40 are arranged at different levels, viz. so that the screw spindle 39 engages the worm gears 37 of the rollers 32 from beneath, whereas the spindle 40 engages the worm gears 38 of the rollers 33 from above. The two spindles 39 and 40 are driven in the same direction of rotation by means of the motor 42 via two belts 43 and 44 as shown in FIG. 5. Accordingly, the two rollers 32 and 33 of each pair of rollers are driven in opposite directions as indicated by the arrows 47 and 48 in FIG. 7. The rollers are coated with a plastic material available on the market under the registered trade mark "Neopren WHV 50-70 shore."

Figures 6, 7:
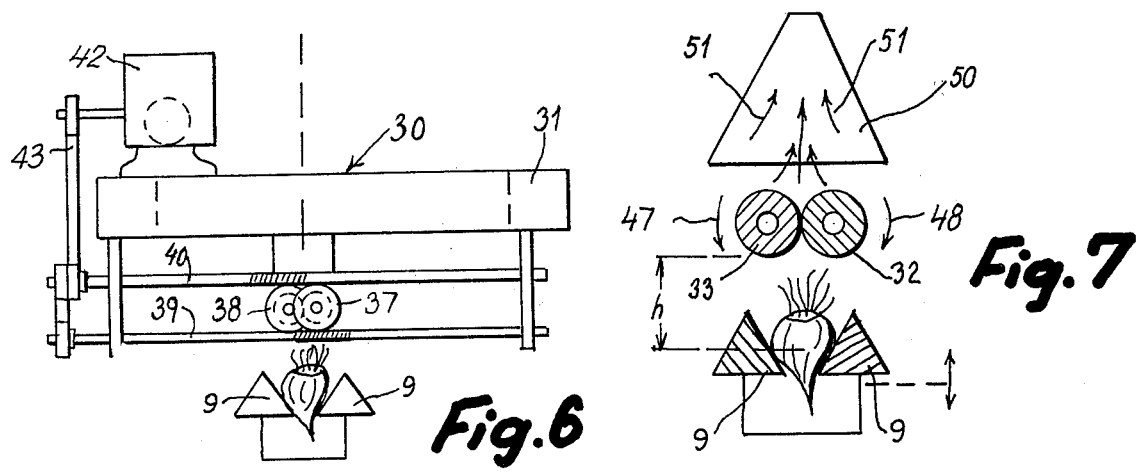
FIG. 6 shows an end view of the upper part of FIG. 4.
FIG. 7 shows a drawing illustrating the operation of the apparatus shown.

Above each pair of rollers a suction box 50 is arranged as indicated in FIG. 7.

The apparatus operates as follows:

After the transfer of the bulbs to the grid by means of the throw-action explained above, the bulbs will, due to the inclined walls of the grooves, occupy a position inversed with respect to the position the bulbs occupy when growing. In other words, the bulb will be orientated with their root balls uppermost as shown in FIG. 7. This orientation will result almost immediately when the bulbs fall into the grooves. In order to offer the bulbs an opportunity to occupy this position, the upper part 30 of the apparatus is arranged a little offset to the right with respect to the left hand end of the grid 8 as shown in FIG. 5.

During the throw-movements explained above and applied to the bulbs by means of the grid, the root balls of the bulbs will be caught by the nips of the pair of rollers 32,33 and it has been proved that if a pair of rollers catches only a portion of the root ball of a bulb, the complete root ball will be pulled off and sucked out through the box 50 as indicated by the arrows 51, FIG. 7. Due to the position which the bulbs occupy and due to the reciprocating movement, the bulbs cannot be caught anywhere in the apparatus and, accordingly, the root ball is removed in a very gentle way.

In FIG. 7, the grid 8, represented by a pair of grid rods 9, is shown in its uppermost position wherein the frame 5 contacts the abutments 10 and the throw movement is initiated. In this position the average height $h$ of the lowermost portions of the rollers 32,33 above the centers of the bulbs is 50-80 mm (depending upon the sizes of the bulbs) and, accordingly, the bulbs move the remaining distance up to the rollers solely due to the throw movement. Experiments have proved that a speed of the rollers amounting to 150-300 revolutions per minute combined with a diameter of the rollers between 20-50 mm gives satasfactory results.

I claim:

1. An apparatus for removing roots from bulbs or the like corms, the apparatus comprising:

a plurality of pairs of rollers for engaging the roots of the bulbs;

an upper frame supporting said pairs of rollers;

means for rotating rollers of each said pair in opposite directions for pulling off the roots of the bulbs;

bulb supporting means positioned below said pairs of rollers, said supporting means being movable between upper and lower positions and being spaced a distance below said rollers in said upper position so as to accommodate a bulb resting upon said supporting means at a position below said rollers;

means for moving said supporting means downwardly from said upper position to said lower position; and, means for rapidly moving said support means upwardly towards said upper position so as to throw the bulbs from said support means towards said rollers to enable the roots to be engaged and removed by said rollers.

2. An apparatus as defined in claim 1, wherein said supporting means is formed as a grid having a plurality of rods, said rods having a shape such as to define downwardly tapering grooves.

3. An apparatus as defined in claim 2, wherein said grid is arranged in extension of a throw-screen.

4. An apparatus for removing roots from bulbs or the like corms, the apparatus comprising:

two frames;

means for moving one of said frames downwardly with respect to the other of said frames to a lower position;

said other frame supporting a plurality of pairs of rollers;

means for rotating said rollers of each said pair in opposite directions;

said one frame including supporting means forming grooves having sloping walls for supporting the bulbs;

abutment means for preventing said supporting means from moving towards said pairs of rollers beyond a predetermined upper position, said upper position being so selected that a bulb, resting upon said supporting means in said upper position is accommodated below said rollers; and, spring means connected between said frames and serving to rapidly move said supporting means upwardly towards said upper position so as to throw the bulbs from said supporting means towards said rollers to enable the roots of the bulbs to be engaged and removed by said rollers.

* * * * *